(12) United States Patent
Yuan et al.

(10) Patent No.: US 12,119,998 B2
(45) Date of Patent: Oct. 15, 2024

(54) NETWORK TOPOLOGY PLANNING AND VALIDATION

(71) Applicant: Dell Products L.P., Round Rock, TX (US)

(72) Inventors: Hong Yuan, Shanghai (CN); HongGang Liu, Shanghai (CN); Yining Chu, Shanghai (CN); Zhe Huang, Suzhou (CN)

(73) Assignee: Dell Products L.P., Round Rock, TX (US)

( * ) Notice: Subject to any disclaimer, the term of this patent is extended or adjusted under 35 U.S.C. 154(b) by 167 days.

(21) Appl. No.: 17/575,472

(22) Filed: Jan. 13, 2022

(65) Prior Publication Data

US 2023/0208718 A1 Jun. 29, 2023

(30) Foreign Application Priority Data

Dec. 23, 2021 (CN) .......................... 202111593321.3

(51) Int. Cl.
  *G06F 15/16* (2006.01)
  *H04L 41/12* (2022.01)
  *H04L 43/045* (2022.01)
  *H04L 43/0811* (2022.01)

(52) U.S. Cl.
  CPC ............ *H04L 41/12* (2013.01); *H04L 43/045* (2013.01); *H04L 43/0811* (2013.01)

(58) Field of Classification Search
  CPC ..... H04L 41/12; H04L 43/045; H04L 43/0811

USPC ......................................................... 709/250
  See application file for complete search history.

(56) References Cited

U.S. PATENT DOCUMENTS

| | | | |
|---|---|---|---|
| 7,310,774 B1* | 12/2007 | Arquie | H04L 41/12 |
| | | | 715/734 |
| 7,342,891 B2* | 3/2008 | Chen | H04L 41/22 |
| | | | 702/182 |
| 8,543,957 B2* | 9/2013 | Takita | H04J 14/0257 |
| | | | 398/43 |
| 9,049,146 B2* | 6/2015 | Liu | H04L 41/0806 |
| 9,384,113 B1* | 7/2016 | Moy | G06F 11/325 |
| 9,385,924 B2* | 7/2016 | Sasaki | H04L 41/22 |
| 9,397,897 B2* | 7/2016 | Sasaki | G05B 19/056 |
| 9,641,390 B2* | 5/2017 | Cudak | H04L 45/30 |
| 9,769,036 B1* | 9/2017 | Sweeney | H04L 41/24 |
| 10,057,137 B1* | 8/2018 | Goldschlager | H04L 41/12 |
| 10,581,688 B2* | 3/2020 | Li | H04L 41/0886 |
| 10,756,984 B2* | 8/2020 | Lane | H04L 12/4675 |
| 11,258,794 B2* | 2/2022 | Adiga | H04L 63/205 |
| 11,379,334 B1* | 7/2022 | Srinivasan | H04L 49/351 |
| 11,394,622 B1* | 7/2022 | Kozlova | H04L 43/0817 |
| 11,405,273 B1* | 8/2022 | Chen | H04L 41/0886 |
| 11,451,449 B1* | 9/2022 | Woan | H04L 41/0806 |

(Continued)

Primary Examiner — Moustafa M Meky
(74) Attorney, Agent, or Firm — Jackson Walker L.L.P.

(57) ABSTRACT

An information handling system may include at least one processor and a memory. The information handling system may be configured to: receive information regarding equipment that is to be communicatively coupled to a data network; determine a topology for communicatively coupling the equipment to the data network, wherein the topology includes information regarding which equipment ports of the equipment are to be coupled to data network ports of the data network; and transmit information regarding the topology to a user.

18 Claims, 4 Drawing Sheets

(56) References Cited

U.S. PATENT DOCUMENTS

| | | | |
|---|---|---|---|
| 11,646,807 B2* | 5/2023 | Sheehe | G06V 10/56 |
| | | | 455/67.14 |
| 11,652,757 B2* | 5/2023 | Gogolev | H04L 47/283 |
| | | | 370/230 |
| 2010/0115415 A1* | 5/2010 | Hickey | H04L 49/65 |
| | | | 715/736 |
| 2016/0378630 A1* | 12/2016 | Narayanan | G06F 11/3041 |
| | | | 710/18 |
| 2019/0372861 A1* | 12/2019 | Roy | H04L 41/22 |
| 2021/0367848 A1* | 11/2021 | Kaag | H04L 45/02 |
| 2022/0070114 A1* | 3/2022 | Gogolev | H04L 45/70 |
| 2023/0078773 A1* | 3/2023 | Woan | H04L 12/467 |
| | | | 709/224 |
| 2023/0166404 A1* | 6/2023 | Zhang | B25J 9/123 |
| | | | 700/264 |

* cited by examiner

NETWORK TOPOLOGY PLANNING AND VALIDATION

TECHNICAL FIELD

The present disclosure relates in general to information handling systems, and more particularly to the planning and topology of network links in clusters of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), planning and implementing network topology in a large-scale datacenter can be very complex. For example, before implementing a network, it can be difficult to calculate accurately how many cables, racks, and other equipment are needed, and how to distribute new devices to different racks, connect them to switches, etc. During implementation of the network, mistakes can also occur even if the network is carefully designed. Furthermore, it can be difficult to determine topology errors after implementing the network until end users actually start to use the network and encounter problems.

Additionally, building a network topology may require a high degree of understanding of the target implementation, including knowledge about switches, hosts, racks, cabling, equipment distribution in the datacenter, and networking requirements. For purposes of this disclosure, the term "topology" should be understood to include information regarding which systems (e.g., information handling systems, switches, routers, etc.) should be coupled together via network cabling, which ports should be coupled to one another, etc.

Accordingly, embodiments of this disclosure may provide a device topology map and wiring design to ease the planning and implementation of a network topology. This disclosure provides ways to generate such a map before planning, and it also provides the capability of validating the topology as soon as the implementation is complete.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with the creation and implementation of network topologies may be reduced or eliminated.

In accordance with embodiments of the present disclosure, an information handling system may include at least one processor and a memory. The information handling system may be configured to: receive information regarding equipment that is to be communicatively coupled to a data network; determine a topology for communicatively coupling the equipment to the data network, wherein the topology includes information regarding which equipment ports of the equipment are to be coupled to data network ports of the data network; and transmit information regarding the topology to a user.

In accordance with these and other embodiments of the present disclosure, a method may include receiving, at an information handling system, information regarding equipment that is to be communicatively coupled to a data network; determining, by the information handling system, a topology for communicatively coupling the equipment to the data network, wherein the topology includes information regarding which equipment ports of the equipment are to be coupled to data network ports of the data network; and transmitting information regarding the topology from the information handling system to a user.

In accordance with these and other embodiments of the present disclosure, an article of manufacture may include a non-transitory, computer-readable medium having computer-executable instructions thereon that are executable by a processor of an information handling system for: receiving information regarding equipment that is to be communicatively coupled to a data network; determining a topology for communicatively coupling the equipment to the data network, wherein the topology includes information regarding which equipment ports of the equipment are to be coupled to data network ports of the data network; and transmitting information regarding the topology to a user.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

Figure 1:
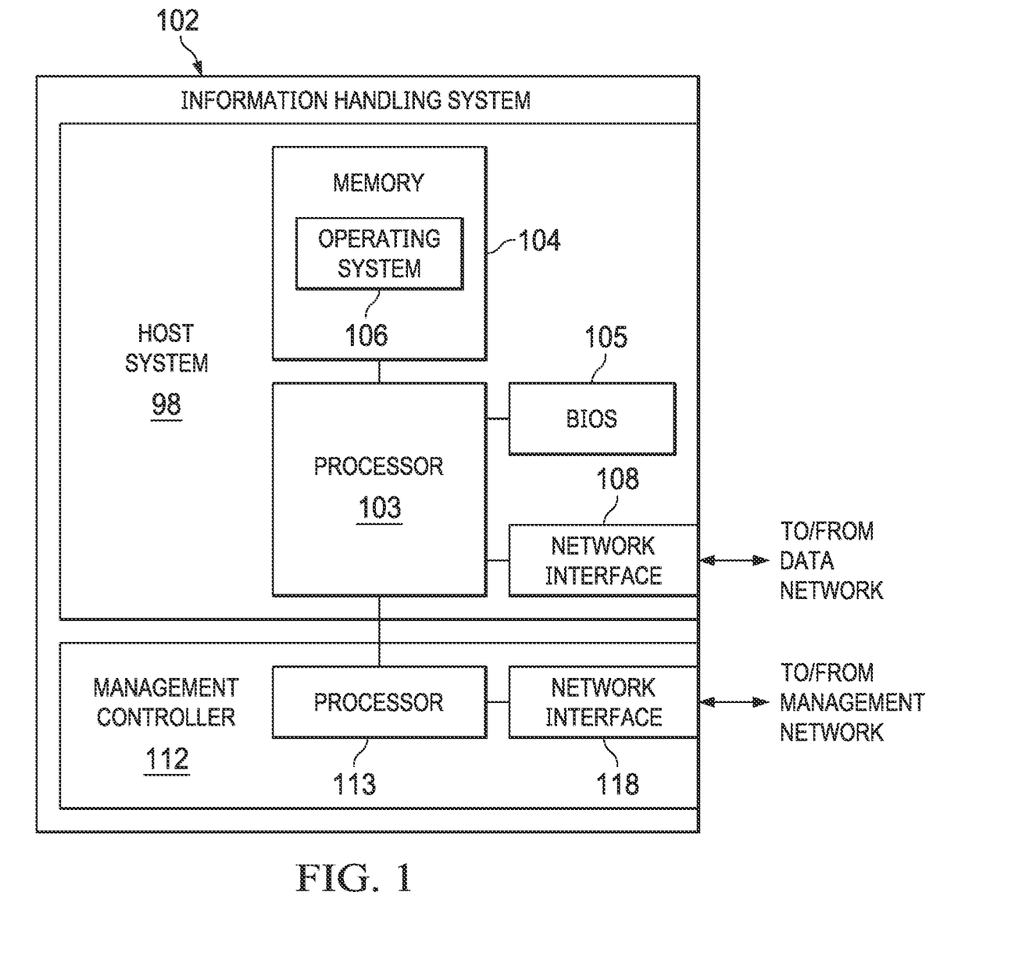
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, this disclosure provides ways of generating a device topology map and/or cabling design to ease the planning and/or implementation of a network topology. For example, when a datacenter is being built, or when additional equipment (e.g., new information handling systems 102, new switches, new routers, new racks, etc.) are being added to a datacenter, such a topology map may be employed to make the task less burdensome. Further, once installation and cabling is complete (e.g., with Ethernet cables, optical fiber, and/or any other suitable data transmission media), embodiments may allow for validation of the as-installed topology to ensure that it conforms to the design.

In some embodiments, a planning/validation tool may be implemented in an information handling system such as information handling system 102 via hardware, software, and/or firmware components. For example, in one embodiment, a planning/validation tool may include a web interface to allow administrators to interact with it in a visual manner. Such a web interface may provide a graphical view of the network topology, as discussed in more detail below with reference to FIGS. 3 and 4. In these and other embodiments, other interface styles (e.g., textual) may be used in addition or in the alternative.

In some embodiments, a single tool may be used for both planning and validation; in other embodiments, separate tools may be used. For the sake of concreteness, this disclosure uses the term "planning/validation tool" to refer to one or more tools that provide such functionality, regardless of whether implemented as a single tool or multiple separate tools. In various embodiments, such a planning/validation tool may execute on information handling systems that are a part of the existing infrastructure of the datacenter, or on information handling systems that are separate from the existing infrastructure.

Some embodiments may provide an agent program that can be downloaded to a client system (e.g., a laptop, a virtual machine, etc.). This client system may then be used as a "jumpbox," and the agent may communicatively couple to one or more network switches of the datacenter as discussed herein.

When new devices are to be installed in a datacenter, various tasks may be undertaken. For example, administrators may determine which racks and switches the new devices will be distributed to. If existing switches are to be used, then the locations, IP addresses, and access credentials (e.g., for SSH access) for those switches may be determined.

Administrators may then input various information into the planning/validation tool. For example, information about the new devices (e.g., device model, number of network interfaces, other hardware and/or software details, etc.) may be transmitted to a planning/validation tool. The tool may then store such information in a database for later usage. The administrator may also input the switch IP addresses and SSH credentials (if any). The tool may then obtain additional configuration information directly from those switches automatically (e.g., which ports are in use, virtual local area network (VLAN) information, etc.).

Figure 2:
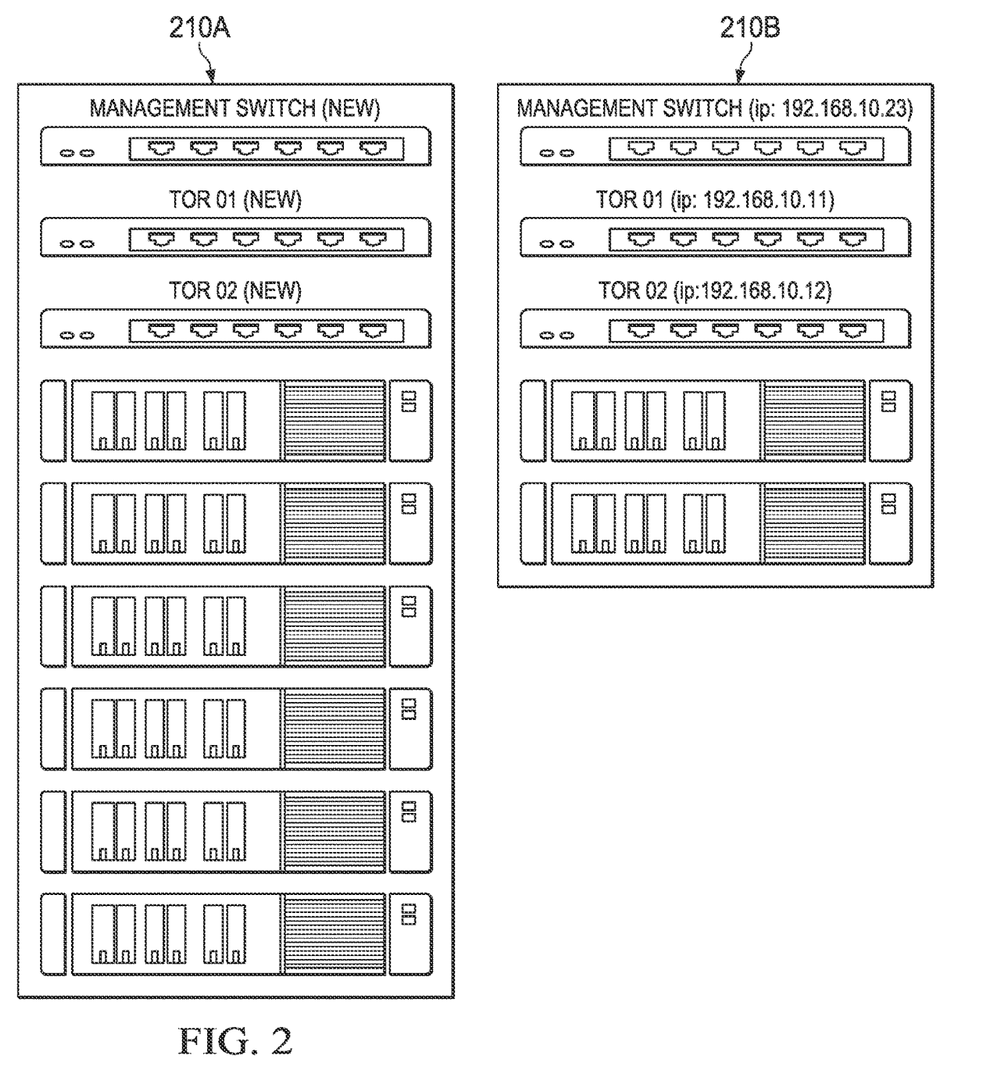
FIG. 2 illustrates a block diagram of an example set of information handling systems, in accordance with embodiments of the present disclosure.

In one embodiment, the planning/validation tool may include an interface to allow an administrator to draw a "map" of how devices should be distributed (e.g., based on rack locations, etc.). Any suitable user interface (e.g., including keyboard, mouse, touchpad, touchscreen, and/or other interfaces) may be used to input information into the map. FIG. 2 provides one example of such a map.

As shown in FIG. 2, rack 210A is to be populated with a new management switch, two new top-of-rack (TOR) switches, and six new information handling systems. Rack 210B includes an existing management switch, two existing TOR switches, and is to be populated with two new information handling systems.

The administrator may also define connectivity rules at this stage. Some examples of connectivity rules may include elements such as:

Management network interface connects to management switches 2 network interfaces per node connect to TOR switches Port 33, 34, 35, and 36 are inter-connect ports between two TOR switches Port 43 is uplink from TOR switch to management switch VLAN configuration rules such as "native 100, 200, 300, 400, 3939" for TOR connected ports Two racks are cross joined on L2, and only on TOR switches In some embodiments, such connectivity rules may also be inherited from existing setups, so that the step of entering new rules may be shortened or omitted when setting up an environment similar to an existing environment. Rules may also be selected from a list of example rules (e.g., with optional modifications as necessary).

Based on the administrator's inputs regarding equipment and connectivity rules, the planning/validation tool may generate a topology. Any suitable method may be used for generation of such a topology. A greedy algorithm may be used in one embodiment, such that, for example, for each desired network connection between a switch and an information handling system, the tool is configured to connect the first available port of the switch to the first available port of the information handling system. Backtracking or other techniques may then be used if necessary to rearrange connections if rule-based constraints are not met or if incompatible connections are generated. In other embodiments, techniques such as depth-first search, breadth-first search, exhaustive search, or any other suitable technique may be used to determine a topology that satisfies the desired constraints.

Further, once the planning/validation tool is connected to the network switch(es), it may help to generate VLANs to meet specified rules.

The cabling for the generated topology may then be displayed graphically for the administrator.

Figure 3:
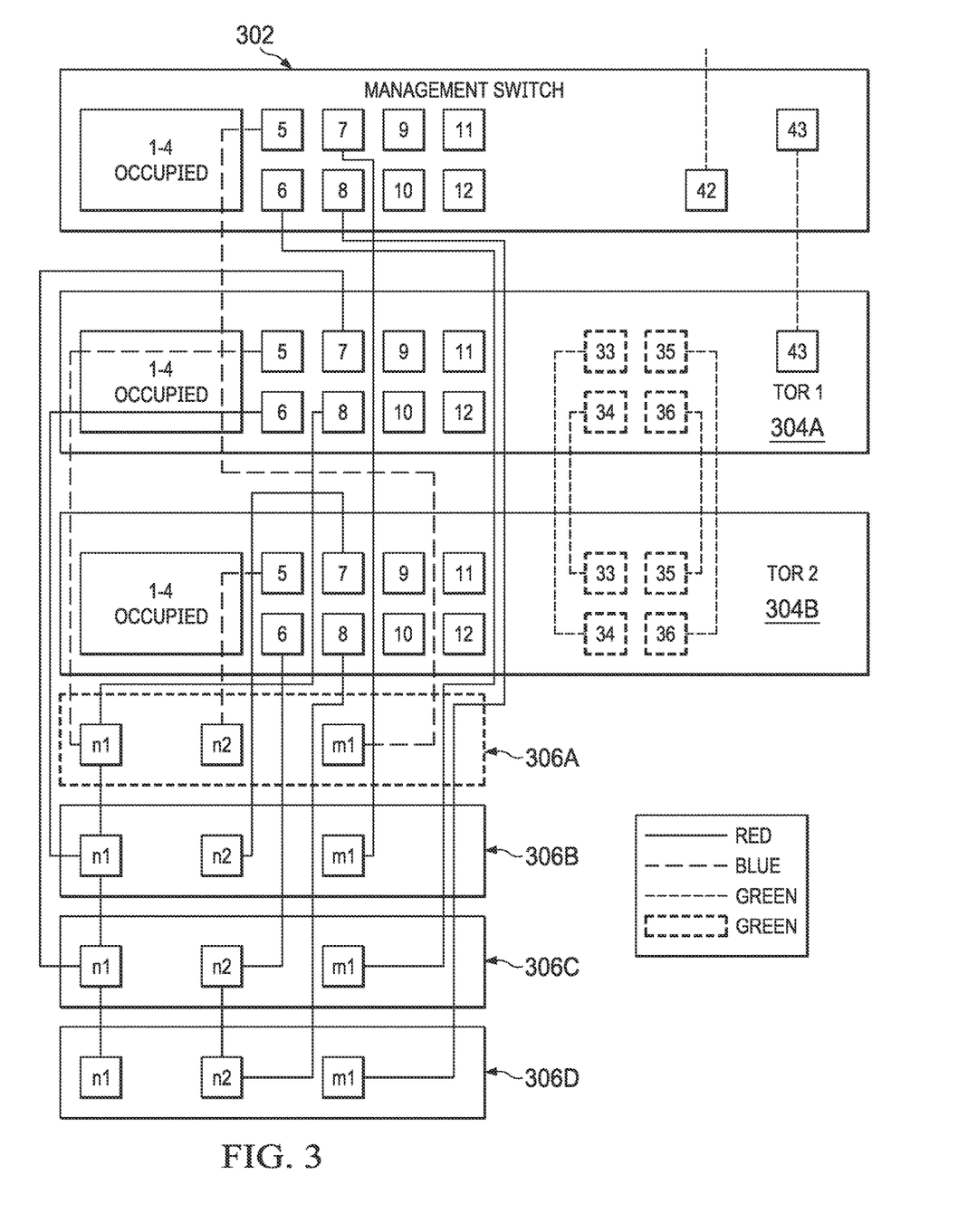
FIG. 3 illustrates a block diagram of an example network topology, in accordance with embodiments of the present disclosure.

FIG. 3 illustrates a portion of an example topology that may be generated by a planning/validation tool according to this disclosure. The generated topology includes the planned network connections between management switch 302, TOR switches 304A and 304B, and information handling systems 306A-306D.

As shown in FIG. 3, color coding or another visual scheme such as dashed lines may be used to indicate cable status. For example, cables that have not yet been installed may be indicated in red, while existing cabling may be indicated in green. Cables to connect to different types of switches may be shown in different types of lines (e.g., dotted/dashed vs. solid lines).

Further, different colors or visual styles may also be applied at the level of information handling systems and/or ports. For example, port color may be used to indicate whether or not a port is in use, whether it is connected correctly or incorrectly, whether it is unconfigured, configured, or partially configured, etc. Information handling system color may be used for similar purposes as well in some embodiments.

In this example, the three switches show that ports 1-4 are "occupied," which may indicate that those ports are in use by other environment. Certain interconnection ports such as ports 33-36 on TOR switches 304A and 304B may be shown in a designated color (e.g., green) indicating that they are already configured. (The wiring associated with those ports may also be displayed in green.)

The uplink from TOR switch 304A to management switch 302 is port 43, and the link may be shown in a designated color (e.g., green) indicating that it is already wired. However, in the example, port 43's VLAN is not configured as expected, and thus it is shown in a designated color (e.g., white) indicating this state.

The planning/validation tool may also allow the administrator to input changes as needed in some embodiments. In the example shown, information handling system 306A is shown highlighted because it is currently selected by the administrator. Further, the network links from the selected element may also be shown highlighted or in a different color. Based on this selection, the planning validation tool may also provide configuration suggestions regarding information handling system 306A (e.g., VLAN configuration suggestions such as:

Connect to management switch: Eth1/5

Port: access PVID: 50 (not configured)

Connect to TOR switch: Eth1/5 (not configured)

Port:trunk Native VLAN: 100

Tagged: 150, 200, 250, 3939

In other embodiments, other types of suggestions may also be shown. Once the administrator is satisfied with the generated topology, the actual implementation may be commenced and the wiring may be installed.

Once the implementation is completed, the administrator may instruct the planning/validation tool to validate the as-installed wiring.

Figure 4:
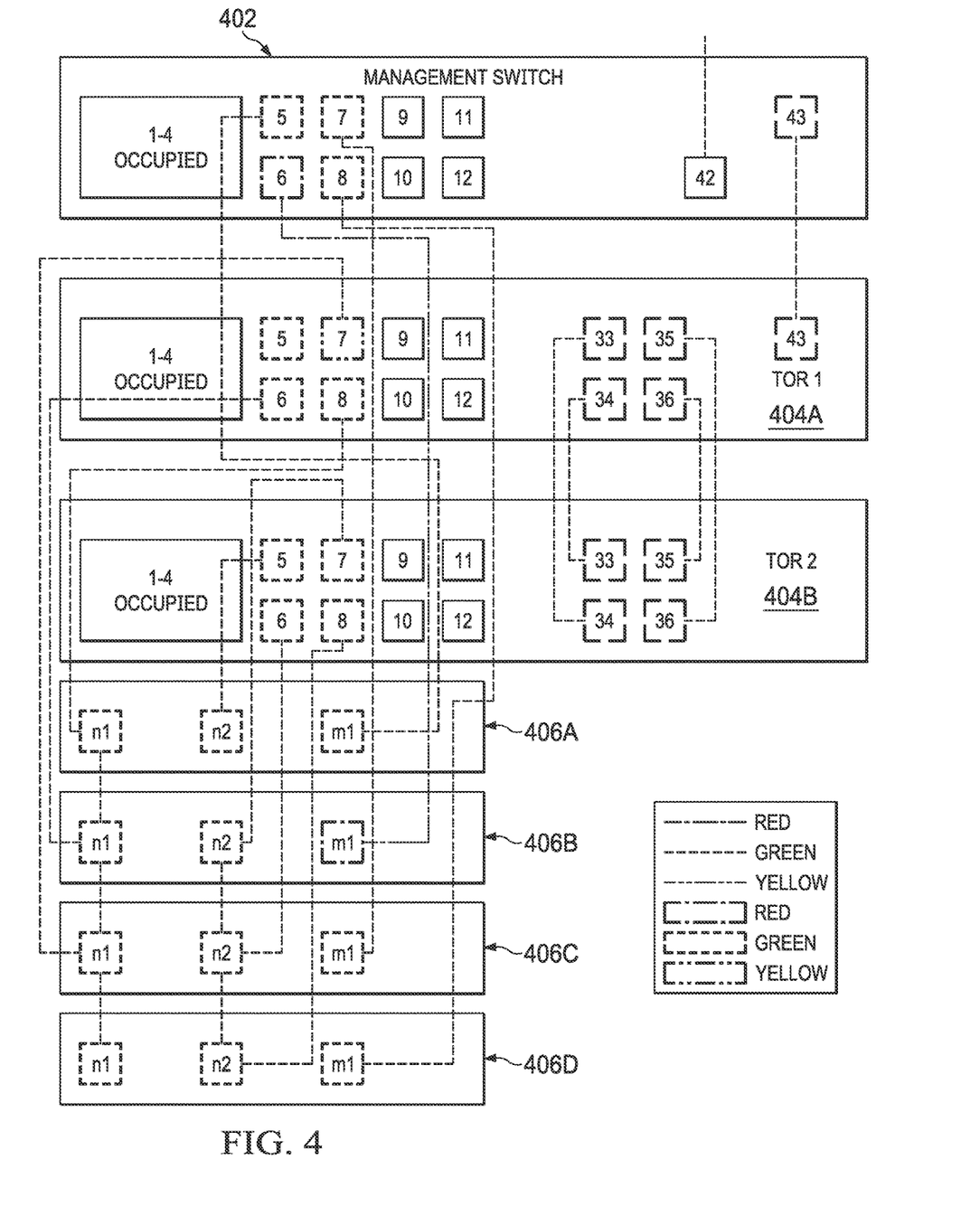
FIG. 4 illustrates a block diagram of validation of an example network topology, in accordance with embodiments of the present disclosure.

FIG. 4 illustrates a portion of the example topology from FIG. 3, as it may be shown after implementation. The validated topology includes the detected network connections between management switch 402, TOR switches 404A and 404B, and information handling systems 406A-406D.

Verified network connections may be shown in a particular color (e.g., green). Missing or malfunctioning connections may be shown in another color (e.g., red).

Ports that do not satisfy specified rules (e.g., VLAN rules) may be shown in red as well. Ports that are configured and satisfy the rules may be shown in green. Partially configured ports may be shown in yellow.

In some embodiments, the planning/validation tool may also provide a textual description of various issues with the validation. For example, the tool may outline issues such as missing wiring, misconfigured VLANs, etc.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a memory;
   wherein the information handling system is configured to:
   receive information regarding equipment that is to be communicatively coupled to a data network;
   receive information regarding connectivity rules specifying connectivity details, port details, and virtual local area network (VLAN) details for the equipment;
   determine a topology for communicatively coupling the equipment to the data network, wherein the topology includes information regarding which equipment ports of the equipment are to be coupled to data network ports of the data network, and wherein the topology is determined to satisfy the connectivity rules; and
   transmit information regarding the topology to a user.

2. The information handling system of claim 1, wherein the equipment includes at least one information handling system.

3. The information handling system of claim 1, wherein the equipment includes at least one item selected from the group consisting of a network switch and a network router.

4. The information handling system of claim 1, wherein the data network is a preexisting data network.

5. The information handling system of claim 1, wherein the information handling system is further configured to, after transmitting the information regarding the topology:
   receive information regarding connectivity of the equipment in the data network;
   verify whether or not the connectivity is in accordance with the topology; and
   transmit an indication to the user regarding the verification.

6. The information handling system of claim 5, wherein the indication includes a color-coded graphical representation of the connectivity.

7. A method comprising:
   receiving, at an information handling system, information regarding equipment that is to be communicatively coupled to a data network;
   receiving information regarding connectivity rules specifying connectivity details, port details, and virtual local area network (VLAN) details for the equipment;
   determining, by the information handling system, a topology for communicatively coupling the equipment to the data network, wherein the topology includes information regarding which equipment ports of the equipment are to be coupled to data network ports of the data network, and wherein the topology is determined to satisfy the connectivity rules; and
   transmitting information regarding the topology from the information handling system to a user.

8. The method of claim 7, wherein the equipment includes at least one information handling system.

9. The method of claim 7, wherein the equipment includes at least one item selected from the group consisting of a network switch and a network router.

10. The method of claim 7, wherein the data network is a preexisting data network.

11. The method of claim 7, further comprising, after transmitting the information regarding the topology:
    receiving information regarding connectivity of the equipment in the data network;
    verifying whether or not the connectivity is in accordance with the topology; and
    transmitting an indication to the user regarding the verification.

12. The method of claim 11, wherein the indication includes a color-coded graphical representation of the connectivity.

13. An article of manufacture comprising a non-transitory, computer-readable medium having computer-executable instructions thereon that are executable by a processor of an information handling system for:
    receiving information regarding equipment that is to be communicatively coupled to a data network;
    receiving information regarding connectivity rules specifying connectivity details, port details, and virtual local area network (VLAN) details for the equipment;
    determining a topology for communicatively coupling the equipment to the data network, wherein the topology includes information regarding which equipment ports of the equipment are to be coupled to data network ports of the data network, and wherein the topology is determined to satisfy the connectivity rules; and
    transmitting information regarding the topology to a user.

14. The article of claim 13, wherein the equipment includes at least one information handling system.

15. The article of claim 13, wherein the equipment includes at least one item selected from the group consisting of a network switch and a network router.

16. The article of claim 13, wherein the data network is a preexisting data network.

17. The article of claim 13, wherein the instructions are further executable for, after transmitting the information regarding the topology:
    receiving information regarding connectivity of the equipment in the data network;
    verifying whether or not the connectivity is in accordance with the topology; and
    transmitting an indication to the user regarding the verification.

18. The article of claim 17, wherein the indication includes a color-coded graphical representation of the connectivity.

* * * * *